United States Patent [19]
Goode et al.

[11] Patent Number: 6,111,034
[45] Date of Patent: Aug. 29, 2000

[54] STATIC CONTROL IN OLEFIN POLYMERIZATION

[75] Inventors: Mark Gregory Goode, Hurricane; Clark Curtis Williams, Charleston; Fathi David Hussein, Cross Lanes; Thomas James McNeil, Hurricane; Kiu Hee Lee, S. Charleston, all of W. Va.

[73] Assignee: Union Carbide Chemicals & Plastics Technology Corporation, Danbury, Conn.

[21] Appl. No.: 09/224,036

[22] Filed: Dec. 31, 1998

[51] Int. Cl.[7] ........................................ C08F 2/01
[52] U.S. Cl. .................. 526/59; 526/68; 526/69; 526/70; 526/161; 526/901; 526/943
[58] Field of Search ................. 526/59, 61, 62, 526/68, 69, 70, 901, 161, 943

[56] References Cited

U.S. PATENT DOCUMENTS

| | | | |
|---|---|---|---|
| 3,242,099 | 3/1966 | Manyik et al. | 252/429 |
| 4,532,311 | 7/1985 | Fulks et al. | 526/62 |
| 4,803,251 | 2/1989 | Goode et al. | 526/59 |
| 4,855,370 | 8/1989 | Chirillo et al. | 526/74 |
| 5,321,107 | 6/1994 | Tsutsui et al. | 526/138 |
| 5,340,786 | 8/1994 | Tsutsui et al. | 502/117 |
| 5,385,991 | 1/1995 | Yamaguchi et al. | 526/74 |
| 5,416,175 | 5/1995 | Song et al. | 526/74 |
| 5,432,242 | 7/1995 | Baron | 526/68 |
| 5,442,019 | 8/1995 | Agapiou et al. | 526/82 |
| 5,543,478 | 8/1996 | Niwa et al. | 526/82 |
| 5,648,581 | 7/1997 | Kubo et al. | 585/501 |
| 5,688,865 | 11/1997 | Ali et al. | 525/53 |
| 5,789,501 | 8/1998 | Chapman et al. | 526/68 |
| 5,834,571 | 11/1998 | Bernier et al. | 526/68 |

FOREIGN PATENT DOCUMENTS

| | | |
|---|---|---|
| 0107127 | 5/1984 | European Pat. Off. . |
| 0229368 | 7/1987 | European Pat. Off. . |
| 0308177 | 3/1989 | European Pat. Off. . |
| 0634421 | 1/1995 | European Pat. Off. . |
| WO13306 | 5/1995 | WIPO . |

*Primary Examiner*—David W. Wu
*Assistant Examiner*—R. Harlan
*Attorney, Agent, or Firm*—P. W. Leuzzi

[57] ABSTRACT

Addition of water to a gas phase olefin polymerization reactor in amounts greater than 3 ppmv permits an increase in the level of condensable gas and facilitates operation of the reactor at an elevated dew point by ameliorating electrostatic phenomena in the reactor; the process inhibits sheeting.

36 Claims, No Drawings

STATIC CONTROL IN OLEFIN POLYMERIZATION

TECHNICAL FIELD

This Invention relates to the fluid bed polymerization of olefins, and particularly to a method of controlling static charges therein. Sheeting is inhibited, and operation at higher recycle dew points is facilitated.

BACKGROUND OF THE INVENTION

The phenomenon known as "sheeting" has continued to cause problems in the use of fluidized beds for olefin polymerization. The incidence of sheeting has been correlated with the presence of electrostatic charges in the reactors. See Fulks et al U.S. Pat. No. 4,532,311.

In U.S. Pat. Nos. 5,321,107 and 5,340,786, water is used as a component of a catalyst for olefin polymerization; the water may be added to the other catalyst components in a hydrocarbon medium. No effect on static in the reactor is reported. See also U.S. Pat. No. 3,342,099 and EPA0308177. In WO 95/13305, water is used to modify catalyst, resulting in increased melt index. See also WO 95/13306.

In European Patent application EPA 0 328 348, water is added continuously as a function of the continuous addition of aluminum as part of a catalyst system, to obtain a desired product flowability. The water addition has no relation to static charge, and no mention is made of static control.

In U.S. Pat. No. 5,432,242, water is used as a volatile metallocene catalyst kill agent for polymer discharged from a high pressure reactor. Water is returned with the recovered monomer to the reactor and is consumed by TMA to form aluminoxane. The monomer and comonomer may also contain water (col 14, line 45) In the flow sheet, these feeds enter the reactor with monomer recovered from the discharge. Catalyst productivity was said to be doubled by using pure water (Example 9) as compared to a mixture of water and glycol-mono-oleate. Very high productivities are shown in Example 15 using water. See also U.S. Pat. No. 5,442,019. In U.S. Pat. No. 5,543,478, steam is used as a deactivator.

In Goode's U.S. Pat. No. 4,803,251, agents are added to a gas phase polymerization zone to drive the static negative or positive toward neutral. Static was measured at a point prone to sheeting. The text of the patent discusses levels up to 25 ppmv on an ethylene feed basis. Water is not claimed or mentioned at this level. The claims are for titanium or vanadium based catalysts with alkyl aluminum cocatalyst. Positive drivers claimed are alcohols, nitric oxide and oxygen. Negative drivers are ketones.

Chirillo et al, in U.S. Pat. No. 4,855,370, disclose a method to reduce sheeting during polymerization of alpha olefins in a low pressure fluidized bed reactor utilizing titanium or vanadium based compounds as catalyst together with alkyl aluminum cocatalysts which comprises introducing water into the reactor in an amount sufficient to maintain the electrostatic levels at the site of possible sheet formation at levels which avoid sheeting without substantially altering the effectiveness of said catalysts. Variations include humidifying a nitrogen stream with water and passing it into the reactor, and water content entering reactor is less than one part per million by volume based on the ethylene feed. At column 7, lines 26–29, it is said that the water fed "can generally range in an amount of 0.1 to 2 ppm based on ethylene feed."

U.S. Pat. No. 5,385,991 discloses a process which obviates static and sheet formation on startup by moistening the seed bed before charging. No further additions of water are mentioned, and static is not monitored.

In EP 604,990-B1 and U.S. Pat. No. 5,638,581, monitoring of current associated with static buildup is stated to be of value in controlling a polymerization reaction. Ali, in U.S. Pat. No. 5,688,865, describe a tandem two-reactor process with a high molecular weight component made in the first reactor and a low molecular weight component made in the second reactor, with a Ziegler-Natta catalyst comprising a transition metal compound as a primary catalysts component and an organometallic compound or metal hydride as reducing cocatalyst, a small amount (0.1 to 0.6 ppmv) of water is added to pressure taps of the first reactor to prevent fouling and presumed sheeting at the pressure taps. Titanium based catalyst and triethylaluminum are the only catalyst and cocatalysts mentioned Antistatic agents said to be useful in preventing the buildup of electrostatic charges in a polymerization system are identified in European Patent Application 0 229 368 A2. The reader may be interested in the operation of the polymerization process with reference to dew point in U.S. Pat. No. 5,453,471 and to the introduction of liquid component in U.S. Pat. No. 5,834,571.

SUMMARY OF THE INVENTION

Water fed at rates of 3 ppmv or greater can be used to neutralize static electricity in the fluid bed during alpha-olefin polymerization. Water should be used at the minimum level required to control the static and without abrupt changes in the rate of addition. Our invention is applicable to all commonly used fluidized bed olefin polymerization processes, including products having density ranges from 0.97 to 0.86, and including dienes such as butadiene as monomers. See U.S. Pat. Nos. 4,482,687 and 4,302,565 for descriptions of a typical fluidized bed reactor and a polymerization process.

The static voltage or current in the fluid bed is monitored at a location near the reactor wall that is prone to sheet formation. Sufficient water is added to drive the voltage to a level that does not cause sheeting. This is preferably to about plus or minus 500 volts, more preferably to about plus or minus 200 volts, and most preferably to about plus or minus 20 volts; values lower than this may be considered negligible.

The amount of water required to counter positive static voltages in the reactor is not a reproducible value. It is a complex function of many variables, illustrative examples of which include: temperature, pressure, monomer and other reactants concentrations, the amount of static inducing impurities in the reactor feed streams, the location that reactants are introduced into the reactor, the polymer molecular weight and molecular weight distribution, the polymer density and crystallinity, the polymer resin particle size and distribution, the amount of fine resin particles, the level of condensibles in the cycle gas, operation in or close to condensing-mode, the velocity of the fluidizing gas, the type, presence and amount of aluminum alkyl or aluminoxane, the method of introduction of the aluminum activator, either supported with the catalyst, on a separate support or separate liquid feed to the reactor, the catalyst type and formulation, and the condition of the reactor including the presence of polymer coating on the reactor wall, the presence of aluminum oxide layers on the reactor walls, the material of construction of the reactor, exposure to the reactor to chromocene containing compounds and the reactor start-up procedure. These variables affect not only the static voltage but also the small currents to ground measured from a probe positioned in the fluid bed at a point prone to sheeting. The effects of such variables are not always consistent. As an example, increasing the reaction temperature by a few degrees may on one occasion diminish the static voltage. On another occasion, decreasing the reaction temperature may increase the static voltage. Such variables may be used to manipulate and adjust the static voltage or current measured in the fluid bed reactor alone or in conjunction with the use of water. Moreover, the addition of water may itself change the dynamics of the process, affecting many of the variables just mentioned.

In accordance with a preferred variation of our invention, water addition is started at a low level and then increased, preferably gradually, from 3 ppmv based on monomer feed until positive static voltages are decreased to a level close to zero or a level that does not cause sheeting. The static response to water addition is almost instantaneous so that the static can be easily manipulated to the desired level. Changes to the water addition rate, in increments of 3 to 30 ppmv, are typically made as often as 5 to 30 minutes. The polymer production rate and productivity of the catalyst is monitored to insure that there is little undue loss in activity. If the static voltage should become excessively negative, the water addition rate may be decreased or discontinued, preferably gradually.

Our invention includes a method of increasing the level of condensable gas in a gas phase olefin polymerization reactor subject to possible sheeting or agglomeration formation comprising (a) monitoring static in a reactor zone prone to sheet or agglomeration formation, (b) adding condensable gas to the reactor until static therein reaches a predetermined limit, and (c) feeding water to inhibit the formation of static beyond a predetermined limit. The method may be practiced in the presence of a single site or metallocene catalyst, the static may be monitored as voltage or current, and an antistatic agent may be fed while the method is practiced. The level of condensable gas is preferably increased by at least two percent of its previous level. See the processes described in U.S. Pat. No. 5,834,571, which is incorporated herein by reference.

Our invention also includes a method of polymerizing olefins in a fluid bed reactor having a gas recycle stream comprising (a) monitoring static in the reactor (b) monitoring dew point of said gas recycle stream (c) when the static is at a predetermined value, adding water to the reactor at a rate of at least 3 ppmv based on monomer addition to the reactor, and (d) operating the reactor at an elevated dew point facilitated by the addition of water. Preferably the dew point is increased by at least 0.5 degree Centigrade and the static will be reduced or substantially stabilized. Again, single site and metallocene catalysts are preferred. The water is preferably added at a rate between about 3 ppmv and 30 ppmv.

Also included in our invention is a method of inhibiting static spiking in a gas phase reactor polymerizing at least one alpha-olefin monomer comprising feeding water to the reactor at a rate of at least 3 ppmv based on monomer feed and in an amount effective to inhibit the spiking. Water feed may begin after observing at least one static voltage spike having an amplitude of about 100 to 10,000 volts above a base line, the spike lasting about 0.1 second to about 1 minute. As is known in the art, an average or base line of monitored voltage may itself be within tolerable limits or it may be beyond a desired maximum level. Our method of inhibiting spiking is applicable in either case; it is to be understood also that static spiking may be monitored in terms of current as well as voltage and that either may be converted to the other for purposes of our invention. Most preferably, the water feed is begun after observing, within five minutes, at least two static voltage (or equivalent current) spikes having amplitudes of about 100 to about 10,000 volts above a base line, said spikes each lasting about 0.1 second to about 1 minute, whereby, after the water feed is begun, the amplitude of the next two spikes, if any, is no greater than 50% of the average of the two spikes next preceding the water feed.

Our method will ameliorate electrostatic effects. It is to be understood that by definition an electrostatic charge is stationary—that is, it does not flow as a current. Yet all practical contemporary methods of measuring a static charge will discharge it to at least an extent or otherwise cause a detectable current flow. Electrostatic charges are commonly detected and measured as voltages and less commonly as current; in either case, spiking may be observed, although some interpretation may be necessary where a large capacitance is present in the instrument. An electrostatic effect, as used herein, is meant to include static measurements as positive or negative voltages, currents, and spikes of either. Other electrostatic effects may be monitored and are also included in our meaning. Our invention includes a method of diminishing an electrostatic effect in a gas phase olefin polymerization reactor comprising monitoring the electrostatic effect in the reactor and feeding at least 3 ppmv water, based on olefin feed, to the reactor and gradually increasing the rate to a rate effective to diminish the electrostatic effect. Preferably the water will be fed at a rate increased to at least 4 ppmv and thereafter at a rate of about 4 ppmv to about 30 ppmv based on monomer feed, but if monomer feed is suspended for any reason, water may continue to be fed at a rate of about 3 to about 30 ppmv based on previous monomer feed.

Also included in our invention is a method of terminating water addition to a gas phase polyolefin reactor in which the water has been added at a rate of 3 ppmv to 10,000 ppmv comprising reducing said rate of water addition gradually to about 50% in a period of at least 15 minutes and to zero in a following period of at least 15 minutes.

DETAILED DESCRIPTION OF THE INVENTION

One method of metering the amount of water added is to ratio it to the monomer feed rate to the reactor. Preferred values of water addition to processes using metallocene or transition metal catalysts are in the range of 0.01 to 1000 ppmv relative to the monomer feed rate, more preferably in the range of about 0.1 to 500 ppmv relative to the monomer feed rate, and most preferably in the range of about 0.2 to 100 ppmv relative to the monomer feed rate. Beyond the effect on electrical properties of the fluid bed reactor, the upper limit to the amount of water that can be added is determined by the loss in catalyst productivity that can be tolerated or by a detrimental effect on the polymer properties. For conventional Ziegler-Natta catalysts, catalyst productivity is lost at about the 1 to 2 ppmv water level.

Illustrative of the catalysts which may be used along with our invention are titanium based catalysts such as those disclosed in U.S. Pat. Nos. 4,376,062 and 4,379,758, chromium based catalysts such as those described in U.S. Pat. Nos. 3,709,853, 3,709,954, and 4,077,904, vanadium based catalysts such as vanadium oxychloride and vanadium acetonate, metalloxene catalysts such as those described in U.S. Pat. Nos. 4,503,914, 4,665,047, 4,752,597, 5,218,071, 5,272,236, and 5,278,272, and single site catalysts generally.

We have found that, for metallocene catalysts with aluminoxane activators, undesirable loss in catalyst productivity may not begin until about 10 to 20 ppmv water addition rate. Some metallocene catalysts activated with non-coordinating anions without aluminum alkyl or aluminoxane activators have heightened sensitivity to deactivation with water, perhaps tolerating at most only 1 to 2 ppmv water. The sensitivity of the catalyst to water is likely determined by the amount of aluminum alkyl or aluminoxane scavenger present in the reaction system—higher levels result in decreased sensitivity to deactivation by water. Lithium, zinc or other metal alkyl scavengers likewise affect the water sensitivity.

As a general rule, it has been found that the catalyst's sensitivity to deactivation by water correlates well to the amount of water that must be added to the reactor to affect the static voltage. The metallocene catalysts activated with methyl aluminoxane or modified methyl aluminoxane are generally resistant to poisoning by water and require relatively high levels of water to induce static voltages in the fluid bed. By comparison, a conventional Ziegler-Natta catalyst is more sensitive to water and requires lower levels of water to affect the static. Such a catalyst system is TiCl3⅓AlCl3 with magnesium chloride on a dehydrated silica support treated with triethyl aluminum with an additional feed of triethyl aluminum to the reaction system at a feed rate at a 30 to 50:1 Al/Ti mole ratio.

The method of metering the water to the reaction system is not restricted in this invention. An ultimate objective of the invention is to control static voltage, thereby inhibiting sheeting, by an effective rate of water addition. As previously discussed, it is convenient to report the amount of water added relative to the monomer feed rate. It might also be controlled relative to the feed rate of a comonomer, hydrogen and non-reactive feed such as ethane, propane, butane, isopentane or hexane. The water feed may also be controlled at a set feed rate regardless of the monomer or other feed rates, and adjusted as required to prevent sheeting. The water may be adjusted relative to the amount of aluminum alkyl and/or catalyst added to the reaction system. This might mean that the amount of water is increased or decreased in response to changes to the cocatalyst or catalyst feed rates—both effects have been observed. The water may also be added or adjusted in response to the polymer production rate, monomer concentration, the weight of resin in the fluidized bed, reaction temperature, or any of the other variables previously discussed to affect the static voltages in the fluid bed. It may be added continuously or intermittently.

The water may be added at any of a number of locations to the reaction system. It may be added mixed with monomer, comonomer, hydrogen or inert diluent feeds to the reactor. It may enter directly into the fluid bed, to the reactor bottom head below the gas distributor plate or in the free-board or expanded section above the fluid bed. It may enter into the cycle gas piping that conveys the gas from the top of the reactor back to the bottom. It may enter the cycle gas piping before the cycle gas blower, after the cycle gas blower, before the cycle gas cooler or coolers, or between or after the cycle gas cooler or coolers. Experience has shown that one preferred location for adding the water is to the cycle gas piping below the reactor bottom head after the cycle gas cooler. If the water is added before the cycle gas cooler, it tends to react with catalyst or activators adsorbed on the internal surface of the heat exchanger rendering the water relatively ineffectual for control of the static voltages. In a more preferred method, the water is dispersed in monomer or a mixed stream of monomers, comonomer, and hydrogen that is introduced into the cycle piping after the cycle gas cooler and before the bottom of the reactor. The water may be introduced into a straight section of cycle piping or into an elbow or inline device that enhances mixing and dispersion of the water in the circulating gas. If an activator such as an aluminum alkyl, aluminoxane or other activator is added to the cycle gas, the water may be added before or after its addition point. It is possible that the water must reach the fluid bed reactor intact in order to affect the static voltage, that is, not reacted with the activator in the cycle piping or below the distributor plate. It may also be possible that the water must react to some extent with an activator in the cycle piping in order to affect the static. In either case, the water addition point may be selected such that there is minimal or enhanced interaction with the scavenger. The water may be added flush at the wall of the cycle gas piping or by a thief or spray nozzle (single or two fluid, internal or external) extending into the cycle gas pipe with the flow perpendicular to or parallel with or against the cycle gas flow. The scavenger may likewise be added flush at the wall of the cycle gas piping or by a thief or spray nozzle (single or two fluid, internal or external) extending into the cycle gas pipe with the flow perpendicular to or parallel with or against the cycle gas flow. The monomer, comonomer(s) and hydrogen and other diluents may likewise be added flush at the wall of the cycle gas piping or by a thief or spray nozzle (single or two fluid, internal or external) extending into the cycle gas pipe with the flow perpendicular to or parallel with or against the cycle gas flow. In a preferred method, the monomer, comonomer, hydrogen and/or diluents are added before the cycle gas cooler so that impurities present in them have less effect on the static voltage in the fluid bed. In another preferred method, the monomer, comonomer, hydrogen and/or diluents are added after the cycle gas cooler, but intimately mixed with the activator prior to entering the reactor. In another method, the monomer, comonomer, hydrogen and/or diluents are premixed with the activator feed in a pipe or vessel prior to entering the reactor, the contact time being sufficient, and the temperature, pressure and concentrations sufficient that the impurities in the feeds that are reactive with the activator do so prior to entering the reaction system while avoiding conditions that lead to oligomerization of the monomer or comonomers.

The water may be added directly to the fluid bed alone or mixed with monomer, comonomer, hydrogen and/or diluents. It may be added flush with the wall, or more preferably, through a tube extending into the fluid bed. The water may be dispersed into the fluid bed using a nozzle (single or two fluid, internal or external). It may be introduced low in the fluid bed, below or at the point prone to sheeting, in the middle of the fluid bed or high in the bed near the top. It may be added at several locations at once. In one embodiment, the water is added with the nitrogen (or other gas including hydrogen) used to convey the catalyst into the reactor, or with the monomer, comonomer, hydrogen and/or other purge flow on the catalyst support tube which holds the catalyst injection tube within the reactor, or in the plenum flow of cycle gas that may surround the catalyst support tube. In another embodiment, the water is added to a flow of gas or liquid that enters the reactor along the circumference of the reactor or at several points around the circumference of the reactor in the region prone to sheeting or just below it.

The water may be added to the top of the fluid bed or to the free-board above the bed, particularly, if the reactor is sheeting in this area. The static probe can be located in this area or multiple probes can be used on the reactor. It is not uncommon to observe different static voltages at different heights in the fluid bed. The sign of the voltage may change from bottom to top—that is the bottom may be charged negatively and the bottom may be charged positively. Thus, water addition to the bottom of the reactor may result in negative charging there while possibly causing positive charging near the top of the reactor. In one embodiment, water is added high in the fluid bed or at the top to control static voltage to a level that prevents sheeting near, at the top of or above the fluid bed. Water passing out of the top of the reactor with the cycle gas passes through the cycle gas cooler which may greatly reduce or prevent it from affecting static voltage in the bottom portion of the bed. The static voltage in the top and bottom of the reactor may be controlled separately by adding water to both locations.

The water may be added to a cyclone that is connected to the cycle gas piping at the top of the reactor for the purpose of removing fine polymer particles entrained with the cycle gas. The water may be added to the down-comer from the cyclone that returns the fine polymer particles to the fluid bed. The water may be added before or to a demisting device that removes condensed liquid from the cycle gas after the cycle gas cooler for the purpose of returning the liquid to the fluid bed separate from the bulk of the circulating gas. The water may be added to the gas exiting the demister that returns to the bottom of the reactor. The water may be added to the condensed liquid exiting the demister. The water may be added before or after a pump or cooler on the line that returns the condensed liquid to the fluid bed reactor. The water may be added to the assisting gas of a two fluid nozzle that sprays the condensed liquid into the fluid bed.

The water may be added to the reactor in a stream of gas or liquid that is recovered from the particulate polymer product leaving the reactor. This may be accomplished by adding water into the product discharge tanks connected to the reactor, or to a vent line from the discharge tank back to the reactor system that has the function of increasing the amount of polymer product discharged into the tank. In one embodiment, the water is added to compressed gases recovered from the product discharge tank and returned to the reaction system. In another embodiment, the water is added to a liquid or gas stream recovered from a purge vessel and returned to the reactor after distillation and/or fractionation to enrich the stream in components required by the reaction process.

The static voltage may be plotted in time such as on a strip chart recorder or by using an electronically rendered graph on a CRT. The range of the measured static voltage is typically from about −10,000 to +10,000 volts or from about −3000 to about +3000 volts on a commercial-scale polymerization reactor. The full-scale range of the static probe may be further reduced if the reactor is particularly prone to sheeting at low levels of static electricity. A typical reduced range is +1000 to −1000 volts. Voltages measured in pilot-scale fluid bed polymerization reactors are generally less than those measured in commercial-scale equipment., i.e. typically from about minus 1000 to +1000 volts.

The record of static voltage plotted in time creates a pattern that provides insights and clues to the electrical status of the polymer particles near the wall in the vicinity of the static probe. For example, the pattern may consist of a narrow or broad band essentially centered around zero volts. In the extreme, the band may narrow to a essentially a straight line, or it may oscillate by several hundred volts positive and negative. Surprisingly, it has been found that water addition can be used to narrow the width of a broad static band around zero. This helps to desensitize the reactor to sheeting. The static band cannot be narrowed in all cases. If water addition tends to broaden the band centered around zero, the addition rate may be reduced. As another example, the static voltage pattern may consist of a band off-set from zero with a net positive or negative value. The use of water addition may narrow the band while maintaining the offset, and/or move the voltage more negative.

Another important observation is that the static pattern may consist of a band with a net negative, neutral or positive charge that includes spikes of several hundred or thousand volts in the positive or negative direction. Generally, these spikes are of the same polarity and are often of the same charge as the net charge measured at the static probe. Individual spikes have a lifetime of a few (two or three) seconds to as much as five minutes and repeat at random intervals also ranging from three or four seconds to two, five, or as much as ten minutes. Their magnitude may vary from spike to spike, and in the worst cases, exceed measurement capability of the static probe. This represents electrical instability in the bed and experience has shown a greater tendency to sheet during such episodes. The use of water addition in accordance with our invention can greatly mitigate spiking, thus inhibiting the tendency to form sheets, independent of whether the static voltage band width is narrowed or whether the net static charge is brought closer to zero from a positive or negative value.

The static voltage pattern may be electronically sampled in time to determine the net charge, particularly if the voltage band is close to zero. If it is found to be negative, the water addition rate may be increased. The static voltage measurement from the probe may be electronically damped to produce a voltage signal more easily interpreted. Without damping, the signal may be extremely noisy and difficult to discern. Damping may be accomplished with conventional resistive, capacitance and inductive devices, or the signal may be filtered electronically.

Although it may at times be desirable to damp the voltage readings, they generally provide a reading more sensitive to static charge than a current measurement of the type discussed in EP 604 990-B1. Nevertheless, we may monitor static in terms of current through an ampereometer similar to that described (FIG. 5) in EP 604 990-B1, by an average or mean value of current as discussed therein or otherwise. The well known and fixed relation of current to voltage means that we may measure and interpret either in relation to the other. Accordingly, when we state herein that we measure or manipulate voltage, it should be understood that we also measure or manipulate current in a predictable or known manner.

There is a variety of methods for introducing low levels of water to the reactor. In one method, a stream of gas, either monomer or diluent such as nitrogen, is humidified by bubbling it through a water column with an optional demister at controlled temperature and pressure. The amount of water passing to the reactor may be calculated from the water vapor pressure and the gas flow rate. This includes an assumption of complete humidification, but even if the gas is only partially humidified, the amount passing to the reactor may be adjusted until the static is controlled at the desired level. The water addition rate is typically adjusted by controlling the gas flow rate while maintaining constant pressure and temperature. The pressure and temperature may also be used for control, but are more difficult to adjust. In another method, liquid water is metered directly to the reaction system or feed streams. This has the advantage of delivering large quantities of water and is less sensitive to fluctuations in temperature and pressure. In another method, steam is metered directly to the reactor or feed streams. In another method, a porous material (non-limiting examples of which include alumina and silica gel such as (trademark) Davison 955 or 948 silica) containing adsorbed water or hydroxyl groups are added to the reaction system. Multiple methods for delivering the water to the reactor may be used simultaneously.

The water addition may be continuous or intermittent. Discreet aliquots of water may be added to the reactor as required to control the static voltage, in which case, the water flow is stopped or decreased between water shots. Some experience has shown that the static may respond relatively quickly to the added water and then move relatively slowly back to its previous level when the water feed is discontinued. Intermittent water feed can then be used to advantage by introducing less water to the reaction system than under continuous feed—the productivity of the catalyst may be less affected for a given result on static. The water addition can be initiated or increased quickly at a high flow rate, or it can be increased gradually from a low value to a high value. The water addition can be discontinued or reduced quickly, or it can be decreased gradually. The water addition may continue if the catalyst or activator feed to the reactor is interrupted, or it may be decreased or stopped until catalyst or activator feed is resumed. However, we prefer gradual or incremental change—experience has shown that the static voltage may sometimes spike positive or negative if the water feed is started or stopped quickly. Also, static voltage may increase in magnitude if the catalyst or activator feeds are changed, that is, either stopped, increased or decreased.

Water addition for static voltage control may be used simultaneously with the addition of an anti-static agent to the polymerization system. Anti-static agents are well known in the art; non-limiting examples of which include ethoxylated fatty acid amines with the trademarks Atmer 163 and AS 990, quarternary ammonium salts and chromium containing compounds such as (trademark) Stadis 450. Any of the antistatic agents listed in European patent application 0 229 368 A2 may be used, such as $C_{12}$–$C_{22}$ fatty acid soaps of alkali or alkaline earth metals, salts of sulfonic acid esters, esters of polyethylene glycols with fatty acids, and polyoxyethylene alkyl ethers. The mechanism by which they function in the fluid bed as an anti-static agent is not well understood, particularly because many of the anti-static agents are said to derive their anti-static properties from the adsorption of water and/or dissociation in the presence of water. Experience has also shown that some supposed anti-static agents may at times induce static charge generation in the fluid bed reactor. Moreover, the addition of an anti-static agent may sometimes have little or no apparent effect on the static voltage, but at other times, it may neutralize the static almost instantaneously. Many of the anti-static agents are highly hygroscopic and may contain relatively high levels of water. Drying the anti-static agent (non-limiting methods include by purging, distillation or passing over and adsorbent) is one method to remove the adsorbed water and may improve the anti-static characteristics of the agent or at least the predictability of its effect. Yet, the presence of water may be required to achieve anti-static properties. The addition of water to the reactor according to our invention may improve the anti-static performance of the agent. Alternatively, non-dried, water containing anti-static agent may be added to the reactor. The water may also be added and pre-mixed with the anti-static agent feed going to the reactor. The role of the catalyst activator must also be considered when evaluating the effectiveness of water addition with an anti-static agent. If, for example, the anti-static agent requires water to function, and the water added to the reactor is consumed by the catalyst activator, the anti-static agent may be non-effectual. Also, if the anti-static agent reacts with the catalyst activator prior to contacting water or contacting the fluid bed, it may also be of reduced effectiveness in controlling the static voltages. It is not unusual to find that the antistatic agent appears to be more effective in the first day or two of operation than at later times. Provided these guidelines, the practitioner skilled in the art will be able to add water, anti-static agent and/or catalyst activator in a manner that controls the static voltages in the fluid bed. In one embodiment, the anti-static agent may or may not be humidified and is added directly to the fluid bed or to the cycle gas pipe below the bottom head. In another embodiment, the anti-static agent and water are added to the cycle gas line below the reactor bottom head and the catalyst activator is added directly to the fluid bed. In yet another embodiment, the amount of anti-static agent and water are adjusted in response to changes in the catalyst activator feed rate. In yet another embodiment, the anti-static agent is added to the expanded section of the reactor above the fluid bed in such quantity that sufficient agent passes through the cycle gas cooler to achieve anti-static performance in the fluid bed (the agent may also fall from the expanded section directly into the fluid bed), and water is added either with the anti-static agent or before or after the cycle gas cooler.

EXAMPLE 1

This example demonstrates the use of water on a production-scale gas phase fluid bed polymerization reactor to control positive static voltages using a zirconium-based metallocene catalyst. It also demonstrates the following: that higher levels of water were required to control the static than specified in the prior art; that water causes negative static which balances the positive charges in the bed; and that water may not be added indiscriminately—that is, too much water may bring about negative static which may lead to sheeting and a reactor shutdown.

Indene (available from Nippon Steel) and $Zr(NEt_2)_4$ (available from Boulder Scientific) were reacted in stoichiometric amounts to form $IndZr(NEt_2)_3$. Gaseous $CO_2$ was bubbled through a 0.05 Molar solution of $IndZr(NEt_2)_3$ for 15 minutes while being cooled with an ice bath. The solution was then sparged for 15 minutes with $N_2$ to remove the excess $CO_2$.

The resulting indenyl zirconium tris-diethyl carbamate catalyst as a 2 wt % solution in toluene was used on a commercial scale reactor. The reactor was nominally 8 feet in diameter and was operated with a bed height of 38 to 42 feet, and a superficial gas velocity of approximately 1.65 ft/sec. The reactor contained approximately 29,000 lbs of granular polyethylene resin.

Catalyst was mixed with MMAO 3A as received at 7.38 wt % Al. Additional dilution was performed by adding isopentane to the mixture. This liquid was introduced to the reactor with a ¼" OD stainless-steel injection tube of 0.18 inch ID.

The injection tube was located within a shroud pipe, which extended 23 inches into the reactor at a height of 6 inches above the distributor plate. The injection tube was centered in the shroud tube with tapered fins, and the tip of the injection tube extended 2 inches into the reactor beyond the end of the shroud tube. The end of the injection tube was tapered, to avoid accumulation of catalyst solution. The shroud tube was also tapered over the last 6 inches. A stream of ethylene was fed through the annular space between the shroud tube and the catalyst injection tube to assist in the catalyst spraying.

The reactor was operated at 80° C. and a total pressure of 253 psig. The ethylene partial pressure set point was 178 psia, and the hexene to ethylene gas-phase molar ratio was 0.026. The polymer production rate was about 5300 lbs/hr. An 8 wt % solution of Atmer 163 in isopentane was added to the reactor to the cycle gas piping before the cycle gas cooler at feed rated up to 4 to 6 lbs/hr. Water was added by humidifying a stream of nitrogen by bubbling it through a water column at controlled temperature and pressure, and introducing the stream to the cycle gas pipe after the cycle gas cooler but before the reactor bottom head. There was no loss in catalyst productivity at the levels of water added to the reactor.

The static voltage had been running about 400 volts positive in a band ranging from about 0 to +800 volts. The Atmer 163 solution feed rate had been 6 lbs/hr and was reduced to 5 lbs/hr. The static voltage responded over the course of 40 minutes by increasing to about +900 volts in a broadened band ranging from 300 to 2000 volts. Water addition was started at 5 lbs/hr humidified nitrogen corresponding to about 6 ppmv on an ethylene feed basis. The static voltage responded within about 2 minutes and decreased over the next 10 minutes from an average of about +800 to +400 with a band width of about 0 to +800 volts. The Atmer 163 solution feed was then decreased from 5 to 4 lbs/hr. Twenty minutes later, the humidified nitrogen feed rate was decreased to 2.5 lb/hr corresponding to 3.1 ppmv on an ethylene feed basis. The static voltage continued to decrease during this time, reaching an average of about +200 volts in a narrow band ranging from about +100 to +300 volts. Five minutes after decreasing the humidified nitrogen feed rate, the catalyst solution feed rate was increased by 0.5 lbs/hr and the MMAO solution feed rate also increase to maintain a 300 Al/Zr molar ratio. The static voltage responded by slowly increasing over the next 35 minutes to about 600 volts in a band extending from +100 to +1000 volts. The catalyst injection line plugged and catalyst and MMAO feed were discontinued. The water addition was also discontinued and the static voltage decreased slightly to +500 volts for the first two minutes. Static then continued to increase slowly over the next 20 minutes, going as high as 1200 volts before settling down to about +750 volts in band ranging from +600 to +900 volts. The Atmer 163 feed was then decreased to about 2 lbs/hr and the static voltage responded within about 2 minutes by spiking to about +2000 volts. Over the next 20 minutes the static continued to periodically spike up to about +2000 volts while the baseline remained at about +800 volts. Water addition at about 1 ppmv on an ethylene feed basis was restarted about 20 minutes after the initial +2000 volt spike. Over the next 40 minutes, the static baseline moved from about +800 to +200 volts with occasional positive spikes. The water and Atmer 163 feeds to the reactor were then stopped and the static voltage responded over the next 30 minutes by increasing to a +1000 volts baseline with positive spiking to +2000 volts with a band ranging from about +700 to +1300 volts. Catalyst and MMAO feeds were then resumed and the static voltage responded by initially decreasing slightly to about +500 volts for the first five minutes and then increasing over the next 30 minutes to about +1100 volts with spikes to +3000 volts. At which time, water addition was resumed at 5 lbs/hr humidified nitrogen feed corresponding to about 6 ppmv on an ethylene feed basis, and the static voltage decreased abruptly from +1100 volts to −1300 volts. The water addition feed rate was then decreased and adjusted over the next three hours to control the static voltage at an average value of about zero volts in a band ranging from about −500 to +500 volts.

EXAMPLE 2

This example demonstrates water addition causing negative static voltages to drift in a negative direction in a pilot scale fluid bed polymerization reactor using a supported metallocene catalyst.

A supported metallocene catalyst was prepared by supporting racemic-dimethylsilyl-bis-(2-methylindenyl) zirconium dichloride and methyl alumoxane on Davison 955 silica. The catalyst formulation was such that there were 33 micro-moles of zirconium for each gram of final catalyst and the Al:Zr ratio was approximately 180:1. The alumoxane used for the catalyst was supplied by the Ethyl Corporation as a solution in toluene. The catalyst was slurried at 20 wt % in mineral oil and fed to the reactor with a piston-type pump.

The polymerization was conducted in a pilot-scale fluidized bed reactor. It consisted of a 14-inch cylindrical section, approximately 10 feet in height, which contained the fluidized-bed. A disengaging section, 24 inches in diameter and approximately 10 feet in height, extended upward from the reaction zone. Monomer and comonomers entered the reaction zone at the bottom of the reactor through a distributor plate. Gas was circulated through the reactor at a rate between 8,000 and 13,000 lbs/hr by a gas compressor. Heat of reaction was conveyed with the cycle gas into the process cooler, which was used for temperature control. The flow rate of reactant and inert gas through the reactor system was adjusted by a ball valve on the recycle line to provide a superficial gas velocity in the polymerization zone of 1.3 to 2.0 ft/sec, preferably, 1.5 to 1.8 ft/sec. Resin was produced at a rate between 30 and 40 lbs/hr to provide a resin residence time of 3 to 4 hours.

Catalyst was conveyed in a stream of isopentane and nitrogen into the reactor through a ⅛" OD stainless steel injection tube. The nitrogen catalyst carrier flow rate was 5 lbs/hr and isopentane catalyst carrier flow rate was 10 lbs/hr. These flows provided acceptable atomization and dispersion of the catalyst solution entering the reactor to achieve a resin average particle size of about 0.02 to 0.05 inch with low fines content and few agglomerates. At some lower limit of nitrogen flow or with no nitrogen carrier, the resin tended to form agglomerates. Agglomerates also formed when the isopentane flow was low. An isopentane carrier flow below 5 lb/hr, for example, tended to form agglomerates with this catalyst. These minimum flow requirements for the liquid and gas carriers may be scaled-up to large nozzles for commercial use based upon momentum flux, gas to liquid ratios, trial and error or other method by one skilled in the art.

The catalyst feed from the piston-type pump was first mixed with the isopentane carrier flow in a ¼ inch stainless steel tube approximately 4 feet long. The objective of the tube was to allow good dispersion of the catalyst in isopentane prior to being conveyed into the reactor at higher speeds by the nitrogen carrier. Various commercially available static or mechanized stirrers may also be used. The nitrogen carrier was introduced at the end of the 4 foot tube, and the mixture was conveyed from that point to the reactor through ⅛ inch stainless steel tubing.

The tip of the ⅛ inch catalyst injection tube was prepared by cutting the tube slowly with tubing cutters. This allowed the end to be necked down, creating a slightly pointed tip with an opening smaller than the internal diameter of the tube. The tube internal diameter was 0.055 inch and the necked down opening was machined by hand to 0.041 inch using a drill bit. Improvements to the design of the nozzle may be achieved by machining a 2 to 60 degree external taper on the outside of the tip, preferably a taper of about 3 to 15 degrees. The very end of the tip may be taken to an essential knife edge where the hole begins, or it can be left square or blunted. The exit hole or nozzle can be machined to more exacting tolerances. For example, the bore length of the nozzle may be adjusted within the range of 0.01 to 200 times the size of the orifice, preferably to within about 0.1 to about 5 times the nozzle diameter. Also, the end the transition geometry from the tube diameter to the nozzle diameter may be abrupt or taken gradually with a taper ranging from about 0 to 90 degrees.

The tip of the catalyst injection tube extended 3.75 inches from the reactor wall into the fluid bed at about the 1 foot level above the distributor plate. A ½ inch diameter support with an internal bore of about 3/16 to 3/8 inch surrounded the nozzle for the first 2.75 inches from the wall. The tip of the injection tube extended about an inch beyond the tip of the support tube. This gave good performance. The tip may be mounted flush with the end of the support tube, inside the support tube or extend beyond the end of the support tube up to the opposite wall of the reactor vessel. The preferred insertion length ranged from 0.25 inch to a length corresponding to about half the reactor diameter. More preferred, the insertion length was 0.5 inch to 3 inches. A purge flow of nitrogen in the range of 0.1 to 10 lbs/hr was provided through the support tube to keep it clear. Other monomers, gases or liquids such as isopentane, hexane and hexene may also be added at the support tube.

Water addition was accomplished by humidifying a stream of nitrogen gas by passing it through a water column at controlled temperature and pressure. The amount of water added was controlled by manipulating the nitrogen flow. The humidified nitrogen entered the reactor at the cycle gas pipe just after the cycle gas cooler.

The polymerization reaction temperature was 80 C, the total reactor pressure was 372 psig, the ethylene partial pressure was 100 psia, the hexene to ethylene mole ratio was 0.0062 to 0.0065 and the hydrogen to ethylene mole ratio was about 0.025. Isopentane was added to the reactor to increase the dew point of the cycle gas to about the 65 to 70 C range. The gas exiting the cooler and entering the bottom of the fluidized bed was about 79.5 C and the reactor was not operating in condensed-mode.

Accumulation of electrostatic charge in the reactor was monitored with two static probes. Each probe consisted of a ½-inch spherical electrode located about 1 inch in the fluidized bed a few feet above the distributor plate. The probe hereby designated as the lower static probe was at the 2 ft level. The other probe hereby designated as the upper static probe was at the 3 ft level. The conducting probe tips were insulated from the reactor walls and the output from the probes measured the potential between the tip of the probe and ground. The voltage ranges for the pilot-scale static probes were ±1500 volts.

The reactor was operating well at the specified conditions and the static voltages measured by both probes in the fluid bed had been running close to zero volts in a narrow band about 50 to 75 volts wide. Water addition was started at 0.20 lbs/hr humidified nitrogen corresponding to about a 6 ppmv water level on an ethylene feed basis. Within minutes, the static voltages measured by both probes became more negative, approaching −100 to −150 volts. The width of the static band also broadened to a width covering about 100 volts. The static voltages gradually returned to near zero after about 30 minutes of continued water addition, but with a band width of about 50 to 75 volts. Over the next two hours, the voltages narrowed slightly and then began to broaden and drift slightly negative again. By about three hours into the test, both static probes were about 50 volts more negative than before the test started, and the band width covered 200 to 250 volts.

The dewpoint of the cycle gas remained at about 66 C throughout the test. The resin fluidized bulk density remained at about 15 lb/ft3 and the resin settled bulk density remained at about 30.5 lb/ft3.

EXAMPLE 3

This example demonstrates negative static spiking in a pilot scale reactor at high cycle gas dew point in the presence of water addition. It also demonstrates that static voltages in the fluid bed may be greatly different within only a foot of bed height.

The test described in Example 2 was allowed to run for several hours. About 8 hours of adding water at 6 ppmv on an ethylene feed basis, the lower static probe began to spike negatively greater than −1500 volts. The baseline that the static voltage returned to between spikes moved negatively from 0 volts to about −100 volts. The upper static probe was unchanged. The reactor was operated for 11 hours in this condition. Performance was acceptable despite the negative static spikes.

The dew point was about 65.5 to 66.5 C during this period, the SBD (settled bed density) decreased to about 28.5 and the FBD (fluidized bed density) decreased to about 13.5.

EXAMPLE 4

This example demonstrates that static spiking can be reduced by lowering the cycle gas dew point.

After 11 hours of operation in Example 3, the dew point was decreased from 66.5 to 64.5 C by decreasing the concentration of isopentane in the reactor. The lower static probe ceased its negative spiking and returned to an average of about zero volts with a band width of about 100 volts. The FBD increased to about 14.5 and the SBD remained at about 28.5. The operation of the reactor remained stable.

EXAMPLE 5

This example demonstrates that increased water addition rates can have the immediate effect of narrowing the static voltage band. This shows that the improvement was not a consequence of a change in the resin particle size or morphology which would have required several hours to manifest.

Two hours after decreasing the dew point in Example 4, the water addition rate was increased from 0.2 to 0.3 lbs/hr humidified nitrogen (6 to 9 ppmv water on an ethylene feed basis). There was no effect on the static measured by either probe. The humidified nitrogen feed rate was increased to 0.4 lbs/hr (12 ppmv water on an ethylene feed basis) 2.5 hours later, and the static on both probes responded within 5 minutes by narrowing. The band width on the upper probe decreased from about 75 to 25 volts, and the band width on the lower probe decreased from about 100 to 30 volts. The net value of both remained about zero volts. The reactor operated well for 9 hours at this water addition level and a dew point of 64 to 65 C. The static voltage band width gradually broadened over the course of the 9 hours to about 100 volts each.

EXAMPLE 6

This example shows that the loss of catalyst feed to the reactor can dramatically affect the static voltages. The example also demonstrates that the static voltage is stable for an extended period of time after the catalyst feed is resumed.

The reactor of Example 5 began to run out of catalyst about 9 hours after the humidified nitrogen was increased to 0.4 lbs/hr. The static voltage band width increased to 200 volts with occasional brief negative spikes to about −400 volts. The upper static probe also spiked negative to about −1500 volts for about 30 minutes before returning to its original average value of about zero volts. The static bands remained broad for about 2 hours while the catalyst feed system was recharged with catalyst. When the catalyst feed resumed, the static bands responded over the course of 5 minutes by becoming extremely narrow. The band width for each probe was as narrow as 5 to 10 volts for the next two hours. The band widths then increased to about 25 volts and remained there for another two hours. The effect seemed to wear off approximately four hours after reinitiating the catalyst feed as the voltage bands broadened to about 100 volts each. The upper static voltage remained about zero but the lower voltage eventually went to about −200 volts and there were occasional instances of prolonged negative spikes to −1000 volts.

The dew point was as high as 66.7 C during the fours hour period following resumption of the catalyst feed. It decreased to as low as 65 C during the period of negative spiking.

EXAMPLE 7

This example demonstrates that water addition reduces static voltage spiking at high dew point operation.

The water addition rate to the reactor of Example 6 was increased from 0.4 to 0.9 lb/hr of humidified nitrogen (12 to 28 ppmv water on an ethylene feed basis). The lower static voltage continued to spike negative for about 20 minutes and then returned to zero volts with a 75 volt band width. The upper static voltage remained at about zero volts but the band width decreased from 100 to 50 volts. The cycle gas dew point had been adjusted to about 67 C by increasing the isopentane concentration in the reactor as the test began. It was gradually increased to 68.4 C over the next 7 hours. During this 7 hour period, the static voltage remained at about zero and both band widths gradually increased to 150 volts. When the dew point reached 68.4 C, the lower static voltage measurement began to spike negative to as much as −1500 volts and the average value was regularly in the −1000 to −2000 volt range. There was no change in the upper static measurement.

The dew point was gradually increased to 72 C over the next 5.5 hours. This corresponded to an isopentane concentration of about 18 mole %. The lower static voltage continued spiking negative to −1500 volts with periods that average −1000 to −2000 volts. The upper static voltage remained about 0 volts in a 150 volt band. The resin FBD was about 15 lb/ft3 and the SBD was about 30 lb/ft3.

The dew point was then lowered gradually over the next 2.5 hours. The lower static probe stopped spiking negative when the dew point reached about 68.5 C. For the next 2.5 hours, both static voltages remained at about zero volts in a 150 volt band. The dew point slowly decreased to about 67.5 C.

Compared to Examples 3 and 4, this example achieved higher dew points without spiking of the static voltage by using higher levels of water addition. The productivity of the catalyst was not affected at the 0.9 lb/hr water addition rate as determined by the catalyst feed rate, resin production rate and measured levels of aluminum in the resin.

EXAMPLE 8

This example demonstrates that discontinuing water addition to the reactor may lead to spiking of the static voltage and increased static voltages. It also demonstrates that reducing the water addition level may narrow the static band.

The water addition to the reactor of Example 7 was discontinued 2.5 hours after the negative spiking of the lower static probe was made to cease by decreasing the cycle gas dew point. The cycle gas dew point remained about 67.5 to 67.6 C during this test.

The lower static voltage became more negative, moving to an average of about −300 volts over the course of the next hour. Static spikes occurred about every 10 minutes to about −1200 volts. The upper static probe remained about zero but the band width began to narrow. During the next two hours, the lower static voltage moved gradually back towards zero volts and the band width narrowed. By 3.33 hours after removing water from the reactor, both static voltages were about zero in 50 volt bands.

EXAMPLE 9

This example confirmed the result observed in Example 2.

Using the reactor of Example 8 water feed was restarted 3.33 hours after it had been stopped. The humidified nitrogen feed rate was 0.88 lbs/hr corresponding to 27 ppmv on an ethylene feed basis. Both voltage measurements initially became more negative by about 150 volts. Over the course of an hour or so, they slowly recovered to near zero voltage but with a broader band width of about 100 volts. This test was continued for about 3 hours and the cycle gas dew point was maintained at about 67.7 C.

EXAMPLE 10

This example confirmed the static voltage behavior observed in Example 8 when the water addition was stopped.

The water addition to the reactor of Example 9 was stopped 3 hours after it was started. The lower voltage measurement moved quickly negative to about −1000 volts with spikes to −1500 volts. It recovered to zero volts after about and hour and the static band narrowed to about 75 volts over the next several hours. The upper static voltage stayed at zero volts and narrowed gradually to a 50 volt band after water addition was stopped. The cycle gas dew point ranged from 68 to 69 C during this time.

This example also demonstrates that dew points of 68 to 69 C do not in all instances cause negative static spiking in the absence of water addition.

EXAMPLE 11

Demonstrates that the loss of catalyst feed may result in increased static voltages in the absence of water addition.

This example supplements Example 8 which observed similar effects in the presence of water addition.

Five hours after stopping water addition to the reactor of Example 11, the catalyst feed was interrupted when the supply in the feeder ran out. Both static voltages moved about 50 volts more negative relative to zero, and their band widths increased from about 50 or 75 volts to about 150 or 200 volts. They remained this way for about 2 hours until the catalyst feed was restarted.

EXAMPLE 12

Demonstrates that the static is well controlled after the catalyst feed is restarted in the absence of water addition.

The catalyst feed was restarted to the reactor of Example 11 and both static voltages responded within 1 or 2 minutes. They narrowed and moved positive to about 100 volts and gradually returned to zero volts after about 30 minutes. Their band widths remained very narrow at a width of about 5 to 10 volts for about two hours before gradually broadening to about 75 to 100 volts 6 hours later.

EXAMPLE 13

This example shows that the water added to the reactor to control the static voltages is more effective if added after the cycle gas cooler.

A pilot-scale polymerization reactor similar to that described in Example 2 was used for the production of a low density polyethylene ethylene-hexene copolymer using a solution catalyst comprising a solution of indenyl zirconium carbamate in solvent sprayed directly into the fluid bed. The activator was a dilute solution of modified methyl aluminoxane (MMAO) and was added separately from the catalyst to the fluid bed. The catalyst was introduced through a nozzle with additional isopentane and nitrogen carrier flows to assist dispersion and atomization. The activator was added as a liquid through a nozzle.

Fouling of the compressor wheel, compressor housing, cycle gas cooler heat exchanger tubes, and the cycle piping between the compressor and cooler were found to begin within a few hours after initiating the polymerization reaction. The fouling rate was such that the reactor could only operate for two or three days before being shut down for cleaning.

A humidified stream of nitrogen was added upstream of the compressor in an attempt to deactivate the catalyst at the fouling sites. There was no change in the static voltage when water was added to the reactor and the feed was discontinued after a short time. Later, the flow rate of water was doubled and there was an immediate increase in the compressor and cooler fouling rate as evidenced by a loss in cycle gas velocity that lead to a reactor shutdown. There was no change in the static from a broad band around neutral.

A possible explanation is that water reacted with the MMAO or trimethyl aluminum in the MMAO and accelerated polymerization of the entrained catalyst caught on the compressor and cooler surfaces. The monomer and other feeds were found to be entering the reaction system by a purge connection to the compressor base that swept the back side of the compressor turbine wheel. Fouling was especially bad there. The monomer and other components feed location was moved to the cycle line upstream of the compressor and the fouling behind the compressor wheel was greatly reduced. Yet, the compressor base and cooler still fouled. A possible explanation is that a water impurity in the feedstreams caused the fouling. Moving the monomer and other components feed location downstream of the compressor or downstream of the cooler would further reduce the fouling. Other methods to reduce the fouling include supporting the aluminoxane on a support, mixing the aluminoxane with the catalyst and feeding them together as a solution to the reactor, and reducing the amount of trimethyl aluminum in the aluminoxane.

EXAMPLE 14

This example demonstrates that the static voltage may not always respond to water even when added at relatively high levels.

An polyethylene homopolymer was prepared in a pilot-scale reactor similar to that described in Example 2. The catalyst was a solution (non-supported) bis-n-butyl cyclopentyldienyl zirconium dichloride compound activated with modified methyl aluminoxane. The catalyst and activator were mixed in a line prior to entering the reactor and sprayed into the fluid bed through a ⅛ inch O.D. stainless steel tube inserted horizontally about 4 inches into the bed at a height about 2 feet above the distributor plate. There was no support tube. The catalyst and activator dispersion was assisted by carrier flows of 5 lbs/hr isopentane and 10 lbs/hr nitrogen. The reaction temperature was 60 C, the ethylene partial pressure was 250 psia, hydrogen was present at a 0.005 hydrogen to ethylene molar ratio, the hexene concentration was about zero, the isopentane cycle gas concentration was 4 mole %, the dew point was 20 C, and the superficial gas velocity was 1.5 ft/sec.

The reactor was producing 20 lbs/hr of polyethylene when 1600 ppmv water on an ethylene feed basis was added to the cycle gas pipe just below the cycle gas cooler. This continued for 10 hours. The static voltage was unaffected, remaining at about 10 to 20 volts throughout the run. The catalyst productivity decreased by 60%.

EXAMPLE 15

This example demonstrates that the upper dew point limit as determined using the static probe was variable. Here it was about 60 C at an 80 C reaction temperature. It was in the range of 65 to 68 C in previous examples without water addition. Operation at dew points as high as 75 to 76 C without water addition has been demonstrated at 80 C on other occasions using a similar pilot-scale reaction system and the same catalyst.

It also demonstrates that lowering the reactor temperature may improve the performance of the static voltage but may be deleterious to reactor operation.

A new test was started on the pilot-scale gas phase reactor described in Experiment 2 using the same catalyst, activator and reaction conditions described therein. The reaction temperature was initially 80 C and the dew point of the cycle gas was about 55 C when the catalyst feed started. Both static probes zeroed when catalyst feed started with a band of about 20 volts although the reaction did not initiate until several hours later. The static bands begin to grow shortly after the reaction began to come on. The cycle gas dew point drifted in time up to about 68 to 69 C, and in the process, both static voltages increased to −800 volts in 200 volts bands. The dew point was gradually lowered over the next 24 hours to 60 C by decreasing the concentration of isopentane in the cycle gas. The net static voltages moved in a slow dance within a range of 0 to −1000 during this time with occasional negative spiking, but did not completely stabilize. The upper probe did eventually settle into a 200 volt band at about −100 to −200 volts, but the lower probe wandered between −200 and −1000. The dew point oscillated a couple of times between 60 and 62 C and the static was reduced at the lower temperature. About 2 wt % of the resin was agglomerates that failed to pass through a ½ inch mesh screen.

The reaction temperature was decreased over a four hour period from 80 to 70 C and the static voltage gradually responded by moving to about zero voltage in a narrow band. The dew point remained in the 60 to 62 C range. Approximately 15 wt % of the resin was agglomerates that failed to pass through a ½ inch mesh screen. The pressure drop across the distributor plate started to increase when the temperature was decreased and the reactor was shut down 15 hours later. A coating of polymer was found from the distributor plate up to about 4 feet along the reactor wall.

EXAMPLE 16

A commercial scale fluid bed polymerization reactor containing about 80,000 pounds of resin was started up at conditions designed to produce a film grade low density ethylene/hexene copolymer having a density of 0.925 g/cc and a melt index of 0.50 dg/m.h. The catalyst was titanium based on a silica support, also containing magnesium chloride, triethyl aluminum, diethyl aluminum chloride, tri-n-hexyl aluminum, and tetrahydrofuran. Approximately 40,000 pounds per hour of resin was produced. The fluidized bed was operated at 90 degrees Centigrade. Ethylene comonomer concentration in the reactor was controlled between about 25 to 45% and sufficient comonomer and hydrogen were added to make the desired product. The remainder of the gas comprised inert nitrogen, ethane, methane, isopentane and hexane. Trimethylaluminum cocatalyst was fed to the reactor at a ratio of 20:1 Al:Ti to 35:1 Al:Ti. Base electrostatic voltage was about +3000 volts as measured by an electrostatic probe in the reactor. The temperatures near the reactor wall as measured by skin thermocouples were frequently spiking 5 to 20 degrees above the bed temperature. Small sheets and rubble were found in the resin discharged from the reactor. At this point 50 grams of liquid water was added to the polymerization system over a period of about ten seconds. The water was added to the gas recirculation line below the point that it entered the main polymerization vessel. On a bed weight basis, this corresponded to 1.4 ppmw. On an ethylene feed basis averaged over an hour, it corresponded to 4,3 ppmv. Over the 10 seconds water was added, the ethylene feed concentration was 1540 ppmv water. The static voltage responded within about one minute by decreasing abruptly from +3000 volts to about zero volts. The spikes on the skin thermocouples ceased, and the skin thermocouples decreased to a range from about 5 degrees below bed temperature to bed temperature. The static voltage remained at about zero for about 30 to 40 minutes and then slowly began to increase in positive voltage. After about 20 to about 30 more minutes the static voltage has returned to about its initial +3000 volt level. Skin thermocouple spikes recommenced. An additional 50 grams of water was added to the reaction system and the static voltage was again approximately neutralized with the beneficial effect of calming the skin thermocouple. Repeated application of water over the next 15 hours reduced the amount of sheet material in the product resin.

In accordance with the examples above, water addition may expand the operability envelope of gas phase polymerization reactors to higher dew points, higher condensables concentrations and higher condensing levels. Water suppressed the onset of static spiking and narrowed the static voltage band as the dew point of the cycle gas was increased by adding isopentane. Increased static spiking and a broad static band have all been correlated with fouling and sheet formation in the fluid bed.

Although not well understood, one possible mechanism to explain this surprising effect is related to the softening of the polymer due to the dissolved condensable gases. Resin particles have an increased tendency to agglomerate and stick together when a hydrocarbon is dissolved in them. Because sheeting may occur at a portion of the reactor wall where the resin layer is stagnant, and the increased resin stickiness contributes to the resin being stagnant, operability limits at high levels of condensables may be controlled by electrostatic effects. It is well known that static charges in the fluidized bed may be neutralized by operation in condensing-mode due to the presence of condensed liquids in the bed. Yet, this liquid may not be evenly distributed throughout the fluid bed because it enters at or close to the distributor plate and evaporates within the first few feet of bed height. Static voltages may still contribute to resin agglomeration and sheeting in regions where the bed is dry even though the reactor is operating in condensed-mode.

The use of water addition to facilitate an increase in the dew point by even 0.5 C results in a significant increase in condensable gas in the reactor which allows operation at higher levels of condensing and increased resin production rates.

The pilot plant examples demonstrated that the sudden removal of water from the reactor is likely to result in an upset to the balance of charging and discharging in the fluid bed. It is proposed that, when water addition is to be discontinued, the water addition be reduced gradually to no flow to avoid static upsets.

During water addition, the reaction must sometimes be slowed or stopped and this often involves turning off the catalyst and activators to the reactor. A difficulty arises when working with a catalyst or polymerization system in which the static voltages in the reactor increase when the catalyst and/or activator feeds are stopped. This may lead to sheet formation that further compromises good reactor operation, creating more circumstances in which the reaction must be slowed of stopped. This results in a vicious circle, feeding on itself, and too often ends in a reactor shutdown.

The mechanism by which static voltages increase with the loss of catalyst and/or activator feeds has not been determined, but it is in some manner related to the delicate balance of electronic charges within the bed. The examples clearly show that stopping the feed of the co-supported metallocene catalyst and MAO activator to the pilot reactor in the presence of water caused an increase in the magnitude of static voltage. Similar effects were observed in the absence of water. This effect is not common to all catalyst systems, certainly not for all metallocene catalyst systems. There are many catalysts which can be stopped with little to no effect on static voltage.

It is also recognized that the activator feed rate and feed location may have a strong influence on voltages in the fluid bed reactor. The activator was added with the catalyst in the solution feed examples, so they were both stopped together. This is because the addition of aluminoxane activator without catalyst tends to result in an increased rate of reactor fouling. Yet, if only the catalyst feed had been stopped and activator feed maintained, it is possible that sheeting might have been avoided. On the other hand, it may be that static and sheeting are controlled by maintaining the catalyst feed independent of the activator. Or it may be that both are required. The operator should be alert for either relationship, The condition of the polymerization system may affect static charging when the catalyst and/or activator feeds are stopped. This was observed on the commercial reactor described in Example 1 during operation with a solution feed mixed catalyst and MMAO (modified methyl aluminoxane). The experience followed a reactor start-up. Static charge built in the bed and sheets were formed when the catalyst and activator feeds were lost due to pluggage of the catalyst injection tip. The tip was cleared and the reaction was restarted only to have to stop the catalyst and activator feed again to clear sheets and agglomerates from the reactor product discharge tanks. Static voltage increased during this time and sheets were formed requiring that the reactor be mini-killed with carbon monoxide. The reaction was restarted and began the process of working the sheets out through the product discharge system. This required that the production rate be occasionally slowed or stopped to prevent the bed level from building too high into the expanded section. After about 5 bed-turn-overs (the amount of resin produced corresponding to the weight of resin in the reactor), it was discovered that the catalyst and activator could be turned off with less effect on static. After about 7 to 8 bed-turn-overs, they could be turned off with no effect on static and without sheeting. The presence of water in the start-up seed bed was implicated in causing the observed transient sensitivity to sheeting induced by interruption of the catalyst and activator feeds. Water addition for static voltage control may on some occasions contribute to static upsets when catalyst/activator feeds are stopped. On other occasions, it has been observed that the catalyst/activator may be stopped in the presence of water addition without affecting static voltages.

Additional alkyl aluminum, aluminoxane or organometallic compounds may be added to the rector system to enhance the effectiveness of the water addition in controlling static voltages and/or current. The water interacts in some manner with such compounds and may also interact with the catalyst to generate electrical phenomena in the bed. For example, it is well known to those skilled in the art that the addition of triethyl aluminum to a seed bed of polymer resin in a gas phase reactor during the reactor start-up procedure often generates negative static voltages due to the reaction with water in the bed. The water is present, but there is no voltage response until the TEAl is present. A similar situation exists in cases in which the catalyst activator is tightly bound to the catalyst support—little may be available to interact with the water. Consequently, higher levels of water may have to be added to the reaction system to generate voltage and current than if the activator had been readily available. This difficulty may be overcome by feeding a small amount of additional compound to interact with the water to induce static voltages. Trimethyl aluminum, triethyl aluminum and tri-isobutyl aluminum are non-limiting examples of such compounds. TMA may be a better choice than TEAL for metallocene polymerizations because TEAL is known to cause extensive sheeting and fouling when present.

What is claimed is:

1. A method of increasing the level of condensable gas in an olefin polymerization process conducted with a single site catalyst in a gas phase olefin polymerization reactor subject to possible sheeting or agglomeration formation, said process including recycling fluid from said reactor, comprising (a) monitoring static in a zone of said reactor prone to sheet or agglomeration formation, (b) adding condensable gas to said reactor until static therein reaches a first predetermined static limit, and (c) feeding water to inhibit the formation of static beyond a second predetermined static limit.

2. Method of claim 1 including feeding an antistatic agent to said reactor in step (c).

3. Method of claim 1 wherein said catalyst is a metallocene catalyst.

4. Method of claim 1 wherein said static is monitored as static voltage and said predetermined static limit is ±500 volts.

5. Method of claim 1 wherein said static is monitored as static current.

6. Method of claim 1 wherein the level of said condensable gas in said reactor is increased in step (b) by at least two percent of its previous level.

7. Method of claim 1 followed by terminating said water feed by gradually reducing the rate of water feed over a period of at least twenty minutes.

8. Method of polymerizing olefins in a fluid bed reactor having a fluid recycle stream comprising (a) monitoring static in said reactor (b) monitoring dew point of said fluid recycle stream (c) when said static is at a predetermined value, adding water to said reactor at a rate of at least 3 ppmv based on monomer addition to said reactor, and (d) operating said reactor at an elevated dew point facilitated by said addition of said water.

9. Method of claim 8 wherein said predetermined value is ±500 volts and whereby said water addition in step (c) reduces or substantially stabilizes said static within ±500 volts, and said dew point is increased by at least 0.5 degree Centigrade.

10. Method of claim 8 wherein said reactor employs a single site catalyst.

11. Method of claim 8 wherein said reactor employs a metallocene catalyst.

12. Method of claim 8 wherein said water is added at a rate between about 3 ppmv and 30 ppmv.

13. Method of inhibiting static spiking in a gas phase reactor polymerizing at least one alpha-olefin monomer comprising feeding water to said reactor at a rate of at least 3 ppmv based on monomer feed and in an amount effective to inhibit said spiking.

14. Method of claim 13 wherein said water feed is begun after observing at least one static voltage spike having an amplitude of about 100 to 10,000 volts above a base line, said spike lasting about 0.1 second to about 1 minute.

15. Method of claim 14 wherein said water feed is begun after observing, within five minutes, at least two static voltage spikes having amplitudes of about 100 to about 10,000 volts above a base line, said spikes each lasting about 0.1 second to about 1 minute, whereby, after said water feed is begun, the amplitude of the next two spikes, if any, is no greater than 50% of the average amplitude of the two spikes next preceding said water feed.

16. Method of claim 13 wherein said polymerizing takes place in the presence of a single site catalyst.

17. Method of claim 13 wherein said polymerizing takes place in the presence of a metallocene catalyst.

18. Method of diminishing an electrostatic effect in a gas phase olefin polymerization reactor comprising monitoring said electrostatic effect in said reactor, feeding at least 3 ppmv water, based on olefin feed, to said reactor, and gradually increasing the feed rate of water to a rate effective to diminish said electrostatic effect.

19. Method of claim 18 wherein said electrostatic effect is undesired static voltage and said monitoring includes monitoring static voltage.

20. Method of claim 18 wherein said electrostatic effect is undesired static current and said monitoring includes monitoring static current.

21. Method of claim 18 wherein said electrostatic effect includes static voltage spiking and said monitoring includes monitoring static voltage spiking.

22. Method of claim 18 wherein said water is fed at an effective rate between about 4 ppmv and about 30 ppmv.

23. Method of claim 18 wherein monomer feed is suspended and water is fed at a rate of about 3 ppmv to about 30 ppmv based on previous monomer feed.

24. Method of terminating water addition to a gas phase polyolefin reactor wherein said water has been added at a rate of 3 ppmv to 10,000 ppmv comprising reducing said rate of water addition gradually to about 50% of said rate in a period of at least 15 minutes and to zero in a following period of at least 15 minutes.

25. Method of claim 18 wherein, after said electrostatic effect is diminished, said rate of water addition is reduced gradually to about 50% of said rate in a period of at least 20 minutes and to zero in a following period of at least 20 minutes.

26. Method of claim 11 wherein said metallocene catalyst is zirconium or hafnium.

27. Method of claim 11 wherein an aluminoxane cocatalyst is used.

28. Method of claim 3 wherein an aluminoxane cocatalyst is used.

29. Method of claim 17 wherein an aluminoxane cocatalyst is also present.

30. Method of claim 2 wherein said antistatic agent includes water.

31. Method of claim 18 including feeding an antistatic agent to said reactor.

32. Method of claim 13 including feeding an antistatic agent to said reactor.

33. Method of claim 8 including feeding an antistatic agent to said reactor.

34. Method of claim 18 wherein an organometallic compound is added to said reactor in an amount effect to additionally diminish said electrostatic effect.

35. Method of claim 33 wherein said organometallic compound is a trialkyl aluminum.

36. Method of claim 33 wherein said organometallic compound is aluminoxane.

* * * * *